(12) United States Patent
Booth

(10) Patent No.: US 11,540,505 B2
(45) Date of Patent: Jan. 3, 2023

(54) MOTORIZED STAND

(71) Applicant: Shawn Allen Booth, Markleton, PA (US)

(72) Inventor: Shawn Allen Booth, Markleton, PA (US)

( * ) Notice: Subject to any disclaimer, the term of this patent is extended or adjusted under 35 U.S.C. 154(b) by 453 days.

(21) Appl. No.: 16/820,113

(22) Filed: Mar. 16, 2020

(65) Prior Publication Data

US 2021/0283467 A1   Sep. 16, 2021

(51) Int. Cl.
| | | |
|---|---|---|
| *A01M 31/02* | (2006.01) | |
| *A63B 27/00* | (2006.01) | |
| *B66B 7/02* | (2006.01) | |
| *B66F 11/04* | (2006.01) | |

(52) U.S. Cl.
CPC ............. *A01M 31/02* (2013.01); *B66B 7/026* (2013.01); *B66F 11/04* (2013.01); *A63B 2210/50* (2013.01)

(58) Field of Classification Search
CPC .... A01M 31/02; A63B 27/00; A63B 2210/50; B66B 9/16; B66B 9/0856; B66B 7/026; B66B 9/00; B66F 11/04
USPC ......................................................... 52/848
See application file for complete search history.

(56) References Cited

U.S. PATENT DOCUMENTS

| | | | |
|---|---|---|---|
| 4,411,335 A * | 10/1983 | Forrester | A45F 3/26 182/180.1 |
| 4,811,803 A | 3/1989 | Green | |
| 5,439,074 A | 8/1995 | Trout et al. | |
| 6,079,517 A | 6/2000 | Payne | |
| 6,264,000 B1 | 7/2001 | Johnson | |
| 6,336,520 B1 | 1/2002 | Amacker | |
| 6,481,529 B1 | 11/2002 | Voorhies | |
| 6,571,916 B1 | 6/2003 | Swanson | |
| 7,281,607 B1 * | 10/2007 | Kiraly | E06C 7/12 182/102 |
| 7,823,694 B2 | 11/2010 | Motes | |
| 8,316,994 B1 * | 11/2012 | Rands | B66B 9/187 187/244 |
| 8,708,104 B1 | 4/2014 | Sponsler | |
| 9,527,712 B1 | 12/2016 | Pigg et al. | |
| 9,717,232 B1 | 8/2017 | Abouelmakarem | |
| 2003/0178251 A1 | 9/2003 | Hewitt | |
| 2007/0095611 A1 | 5/2007 | Oertwig | |
| 2007/0169996 A1 * | 7/2007 | Blue | A01M 31/02 182/141 |
| 2008/0271948 A1 * | 11/2008 | Motes | A01M 31/02 182/141 |
| 2008/0283334 A1 | 11/2008 | Fickey et al. | |
| 2019/0241414 A1 * | 8/2019 | Willard | B66B 9/00 |

(Continued)

FOREIGN PATENT DOCUMENTS

| | | | | |
|---|---|---|---|---|
| JP | 04317979 A | * | 11/1992 | ............. B66B 7/026 |
| JP | 09086825 A | * | 3/1997 | ............. B66B 7/026 |

*Primary Examiner* — Robert Canfield
(74) *Attorney, Agent, or Firm* — Dunlap Bennett & Ludwig, PLLC

(57) ABSTRACT

A motorized stand for attachment to a tree includes a stand assembly, a carrier assembly, and an elongated track assembly. The stand assembly includes a motor and a platform, with the carrier assembly releasably coupling with the stand assembly and the elongated track. The elongated track includes a plurality of track assemblies that are connectable to one another via complementary structure at the ends of each track assembly.

10 Claims, 6 Drawing Sheets

(56) References Cited

U.S. PATENT DOCUMENTS

2019/0336828 A1\* 11/2019 Hines ..................... A63B 27/00
2020/0115190 A1\* 4/2020 Xiong ..................... B66B 7/02

\* cited by examiner

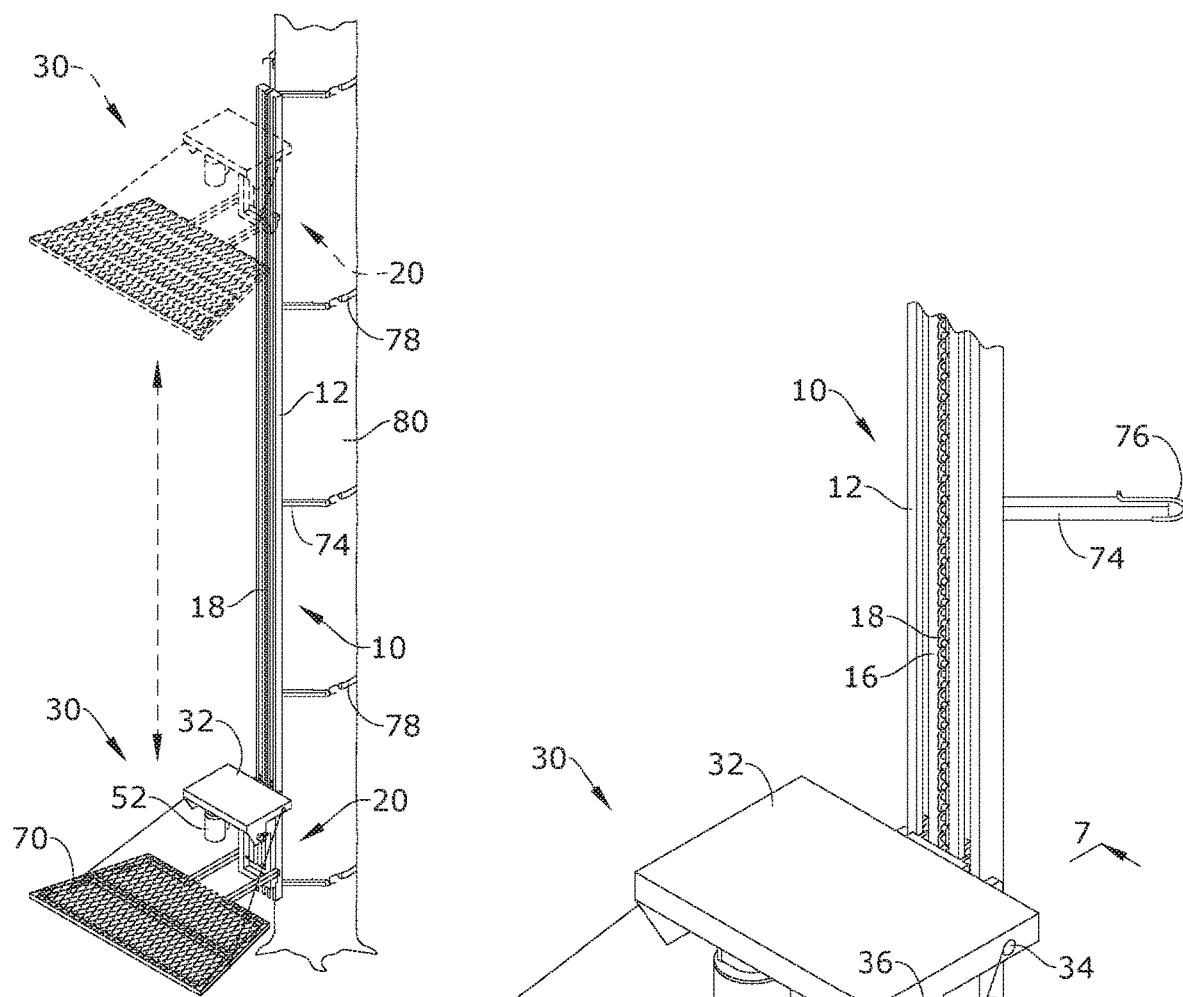
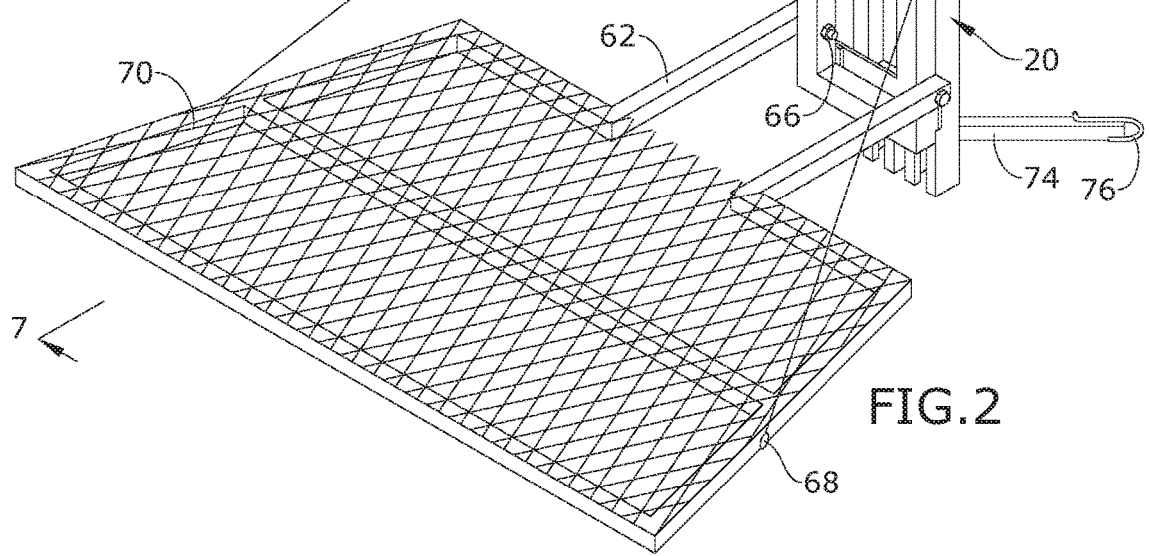

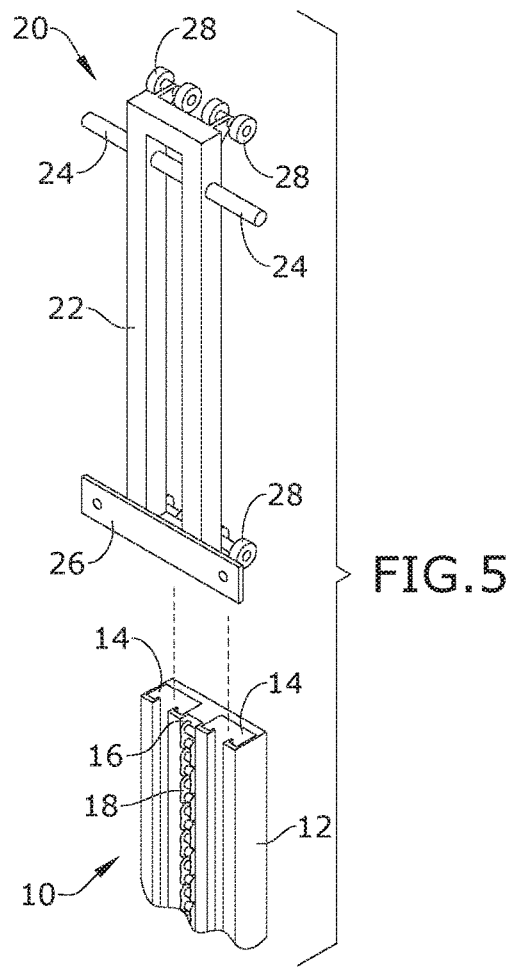
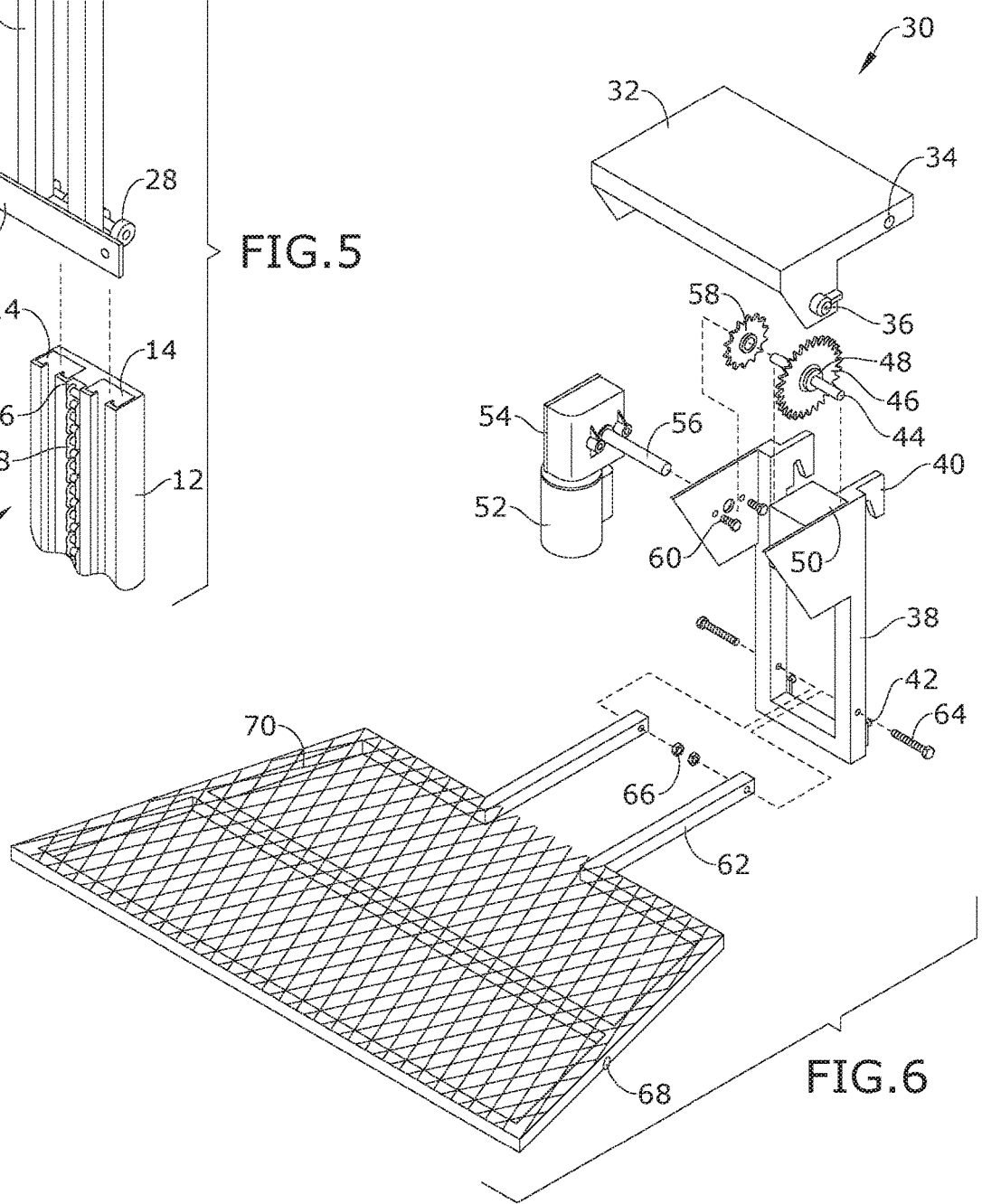

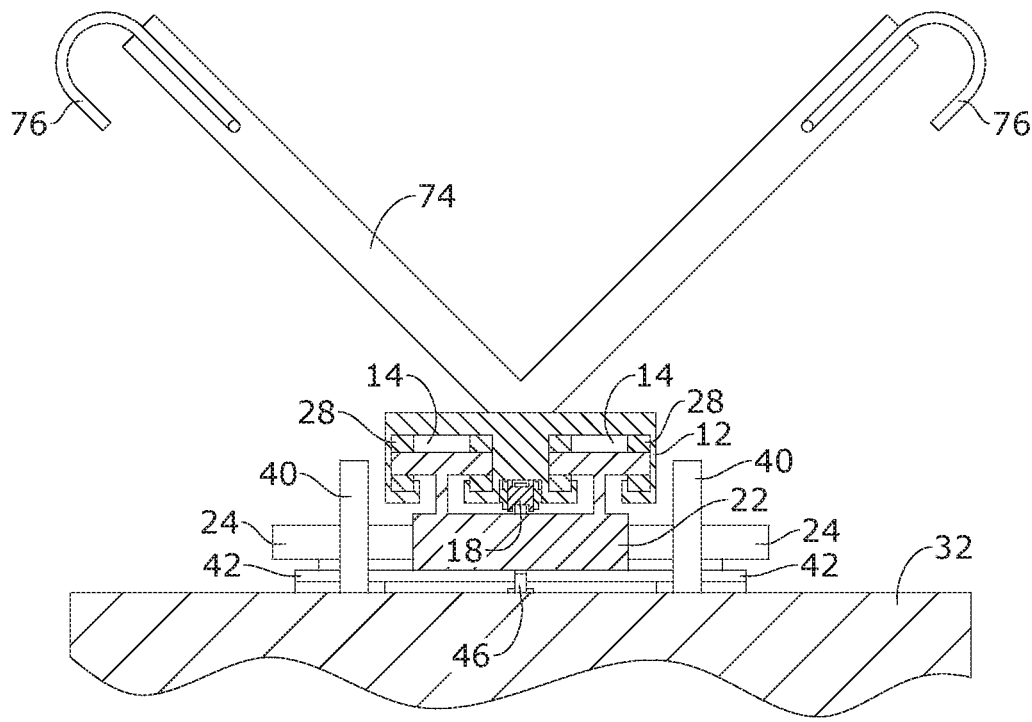

FIG.9

| THE STAND TRACK IS ATTACHED TO A TREE USING STRAPS, WITH THE CARRIER INSTALLED AND RESTING AT THE BOTTOM OF THE TRACK |
|---|
| THE USER INSTALLS THE STAND ONTO THE CARRIER HOOKS AND THEN BOLTS IT INTO PLACE, LOCKING THE DRIVE GEAR INTO THE TRACK |
| ONCE SEATED ON THE STAND, THE USER PRESSES THE SWITCH, ENGAGING THE MOTOR TO TURN THE DRIVE GEAR AND RAISE THE STAND UP THE TRACK |
| WHEN THE USER IS READY TO COME DOWN, THE PRESS THE SWITCH IN THE OTHER DIRECTION, REVERSING THE GEAR MOTION TO LOWER THE STAND |
| IN THE USER DESIRES A HIGHER FINAL POSITION, THEY CAN ATTACH AN EXTENSION AT THE TOP OF THE TRACK |

FIG.10

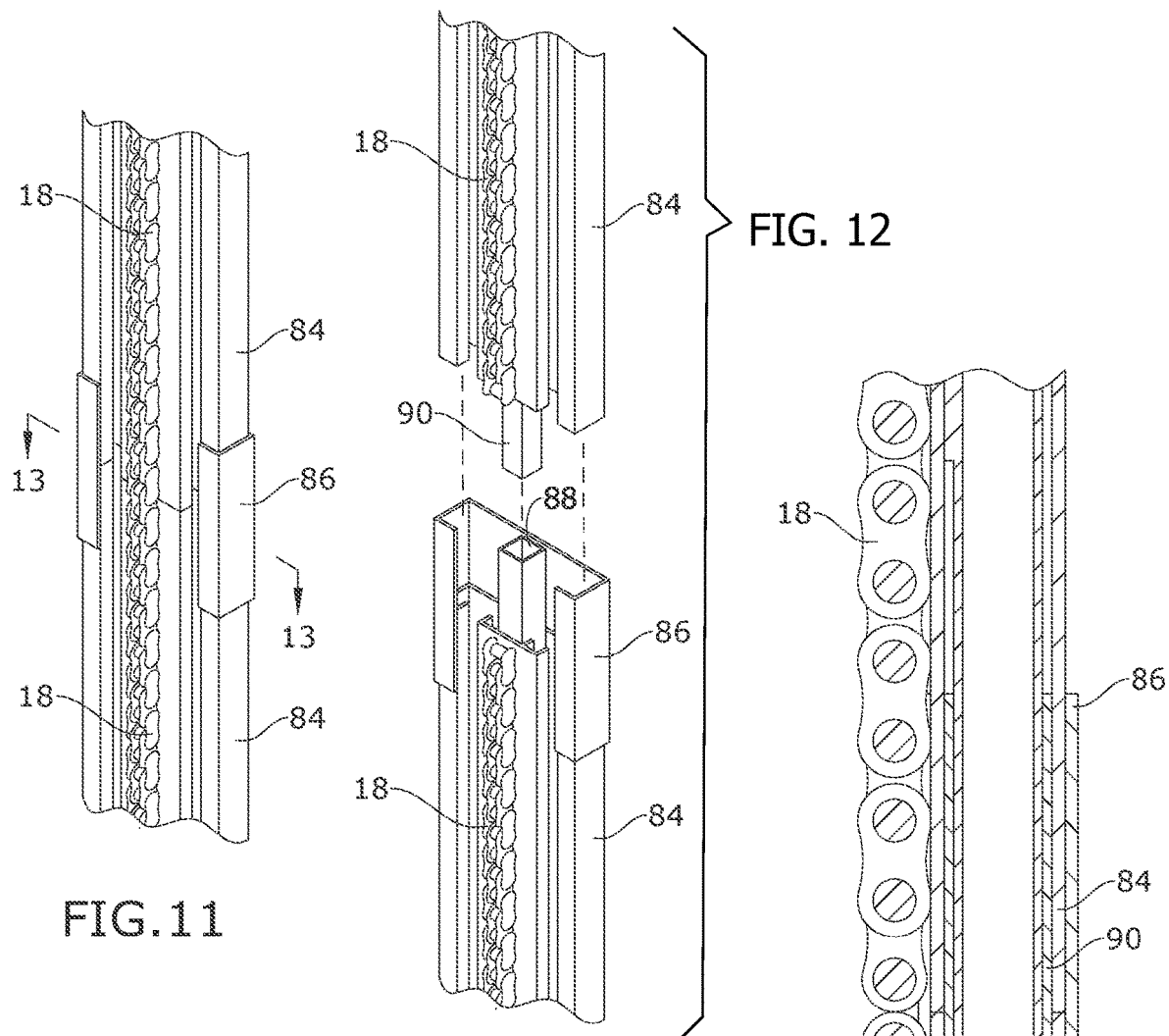

MOTORIZED STAND

BACKGROUND OF THE INVENTION

The present invention relates to a motorized stand, and, more particularly, to a portable, motorized tree stand that breaks down into separate components for easy transport and is easy to assemble.

Hunters have long recognized and appreciated the advantages gained by hunting from an elevated position with a modern tree stand. Properly designed and engineered stands provide a safe means to sit and move the stand up and down as needed, allowing the hunter to sit and wait for his or her target to come into range. Conventional tree stands are bulky and difficult to transport and set up. They commonly require two or more physically fit individuals.

These conventional tree stands are not usable for individuals that have physical limitations, nor are they a good option for an individual hunting alone who does not have the strength to lug around a very heavy and bulky tree stand unit. If a hunter wants to change location, that exacerbates the issue of portability. It is simply not practical to expect a hunter to have a partner that can aid in transport and setup of the hunting stand.

As can be seen, there is a need for a portable, motorized tree stand that breaks down into separate components for easy transport and is easy to assemble.

SUMMARY OF THE INVENTION

In one aspect of the present invention, a motorized stand for attachment to a tree comprises: a stand assembly comprising a motor and a platform; a carrier assembly releasably coupling with the stand assembly; and an elongated track comprising a plurality of track assemblies configured to connect to one another, each track assembly comprising: a track frame; a coupling sleeve at a first end of the track frame; a male coupling tube at the first end of the track frame; and a female coupling tube extending from a second end of the track frame and configured to couple with the male coupling tube of an adjacent track assembly, the carrier assembly releasably and movably coupling with the elongated track, and the motor being configured to drive the stand assembly and carrier assembly along the elongated track when the stand assembly, carrier assembly, and elongated track are coupled.

These and other features, aspects and advantages of the present invention will become better understood with reference to the following drawings, description and claims.

BRIEF DESCRIPTION OF THE DRAWINGS

FIG. 1 is a perspective view of an embodiment of the present invention, shown in use;

FIG. 2 is a detailed view of the embodiment of the present invention;

FIG. 5 is an exploded view of a carrier assembly and a track assembly, with hooks not shown for clarity;

FIG. 6 is an exploded view of a stand assembly of the embodiment of the present invention;

FIG. 9 is a section view of the embodiment of the present invention, taken along line 9-9 in FIG. 7;

FIG. 10 is a flow chart of the embodiment of the present invention;

FIG. 11 is a perspective view of an alternative track of the present invention;

FIG. 12 is an exploded view of the alternative track of FIG. 11;

FIG. 13 is a section view of the alternative track the present invention, taken along line 13-13 in FIG. 11; and FIG. 14 is a section view of the alternative track of the present invention, taken along line 14-14 in FIG. 13.

DETAILED DESCRIPTION OF THE INVENTION

Figure 3:
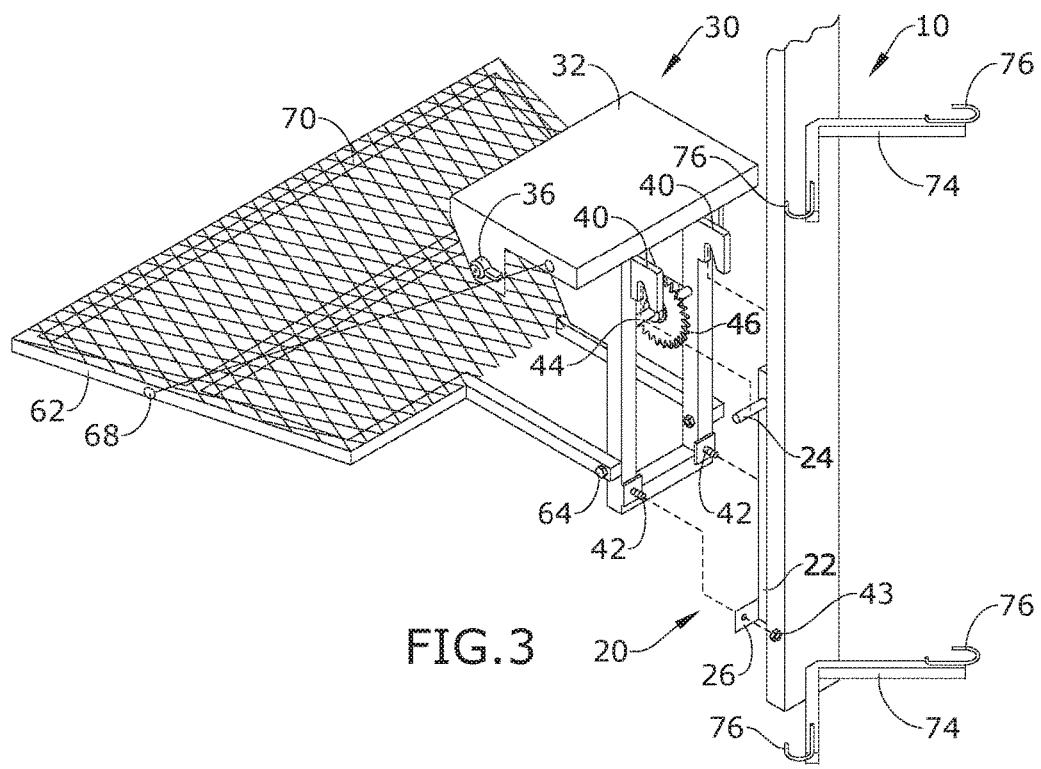
FIG. 3 is a rear perspective view of the embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention is a motorized stand that breaks down from an assembled unit into separate components, simplifying the transport process of the stand between sites as well as where the stand is generally stored when not in use. Advantageously, the stand is configured so that a single user can assemble and disassemble the stand, even if the user has physical limitations.

Referring to FIGS. 1-9, certain embodiments of the present invention include an elongated track 10, a carrier assembly 20, and a stand assembly 30. FIG. 1 is a perspective view an embodiment of the present invention, shown in use, illustrating the movement of the carrier assembly 20 and the stand assembly 30 along the elongated track 10 (see solid and dashed line rendering of the stand assembly 30 in FIG. 1). The elongated track 10 includes a track frame 12, wheel guide slots 14, a track slot 16, and a chain track 18. The elongated track 10 can be a single-track assembly (depending upon the desired height of the stand when in use), or, in certain embodiments, can include multiple track assemblies that are attachable and detachable to one another (FIGS. 11-14).

To attach the track assembly 10 to a tree 80, tree brackets 74 are provided on a back side of the track assembly 10. In certain embodiments, the tree brackets 74 form a V-shape and rest on the tree 80. Each tree bracket 74 is provided with hooks 76 at its distal ends. A strap 78 is connected to one hook 76 and extended around the tree 80 and connected to the second hook 76 to secure the track assembly 10 in place.

As shown in FIGS. 1-5, the carrier assembly 20 serves as an intermediary between the elongated track 10 and the stand assembly 30. The carrier assembly 20 includes a carrier frame 22 defining an opening (FIG. 5), carrier pegs 24 disposed on an upper portion of the carrier frame 22, an attachment bar 26 including openings (FIG. 5), and pairs of roller wheels 28 disposed at the top and bottom of the carrier frame 22. The roller wheels 28 are slid into the wheel guide slots 14 on the elongated track 10, and in operation, as shown in FIG. 9, roll within the wheel guide slots 14 to move along the length of the elongated track 10.

As shown in FIGS. 1-4 and 6-8, the stand assembly 30 includes a seat 32, a stand frame 38, a drive gear 46, a battery 50, a motor 52, a speed reducing gear 58, a base frame 62, a base deck 70, and support cables 72. The base frame 62 and base deck 70, in combination, form a platform. The base frame 62 is secured to a lower end of the stand frame 38 via base bolts 64, and base nuts 66. The support cables 72 provide additional support to the base frame 62 and are attached to the seat 32 via support cable attachment points 34 and to the base 62 frame via base support cable attachment points 68. A pair of peg hooks 40 are provided on a back side top end of the stand frame 38, and attachment bolts 42 are provided on a back side lower end of the stand frame 28.

Figure 4:
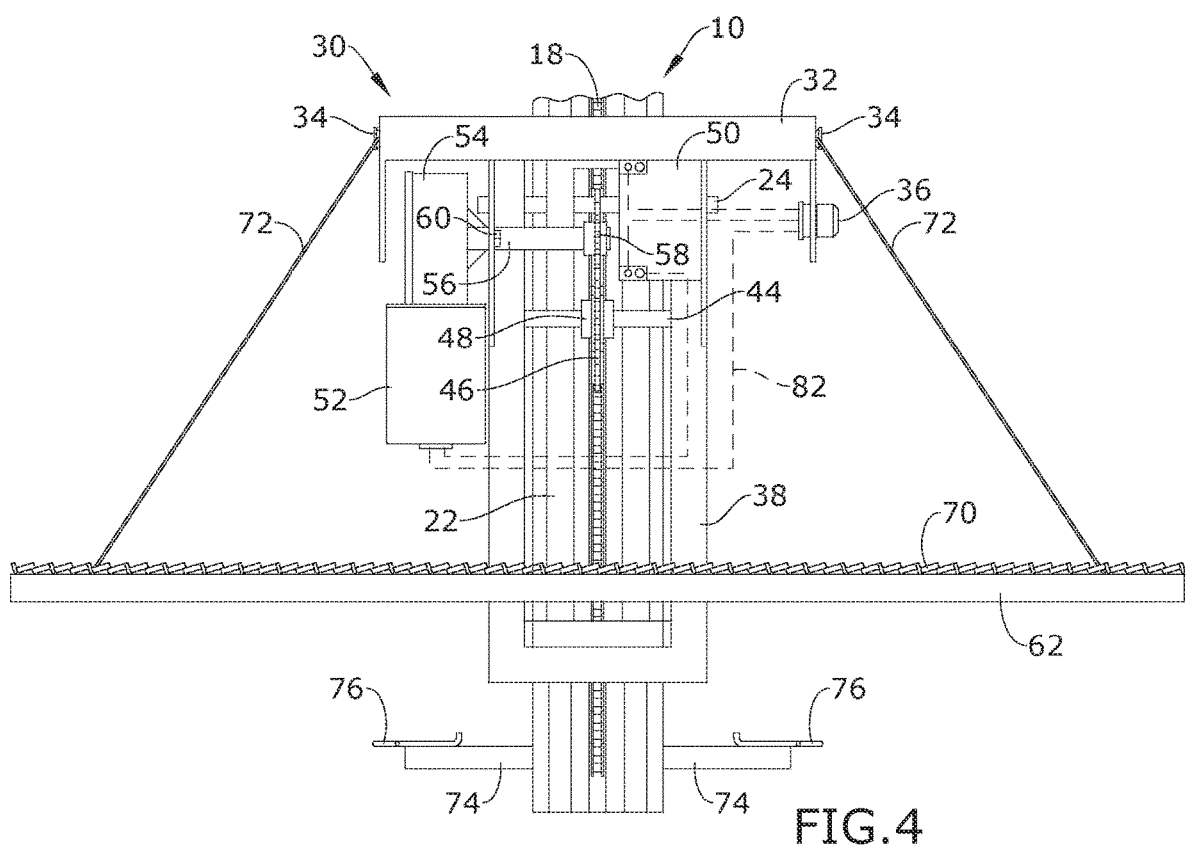
FIG. 4 is a front view of the embodiment of the present invention, with wiring connections shown schematically for clarity.
Figure 7:
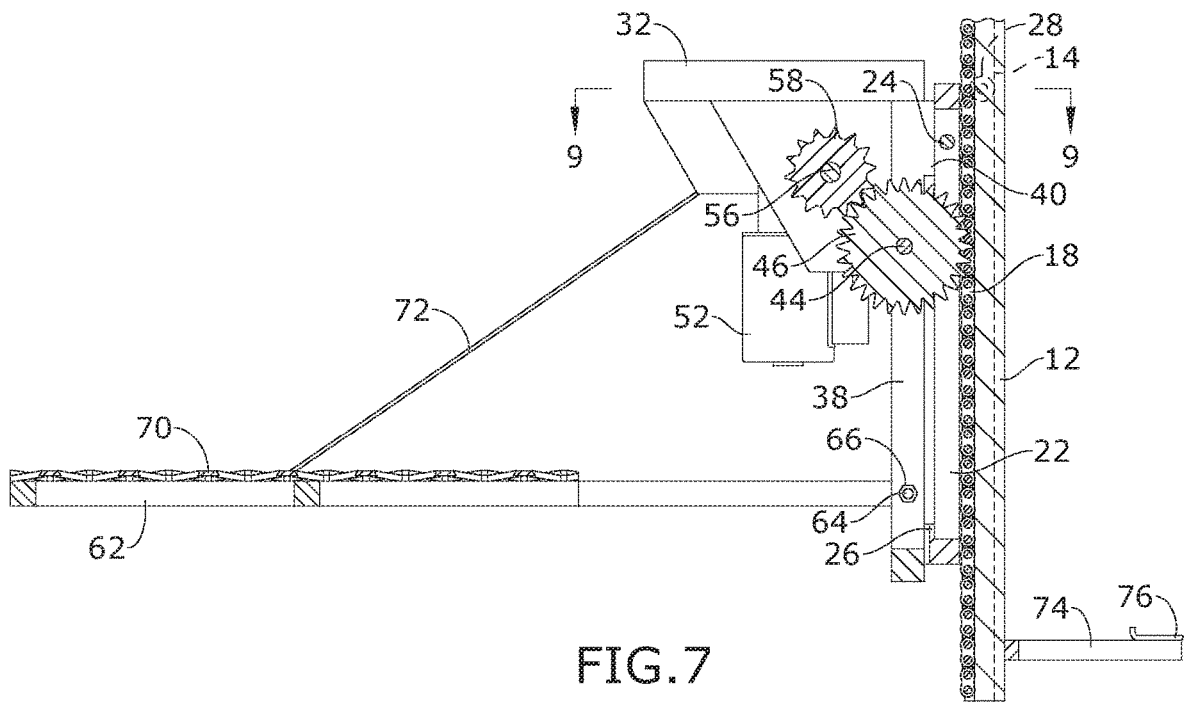
FIG. 7 is a section view of the embodiment of the present invention, taken along line 7-7 in FIG. 2.
Figure 8:
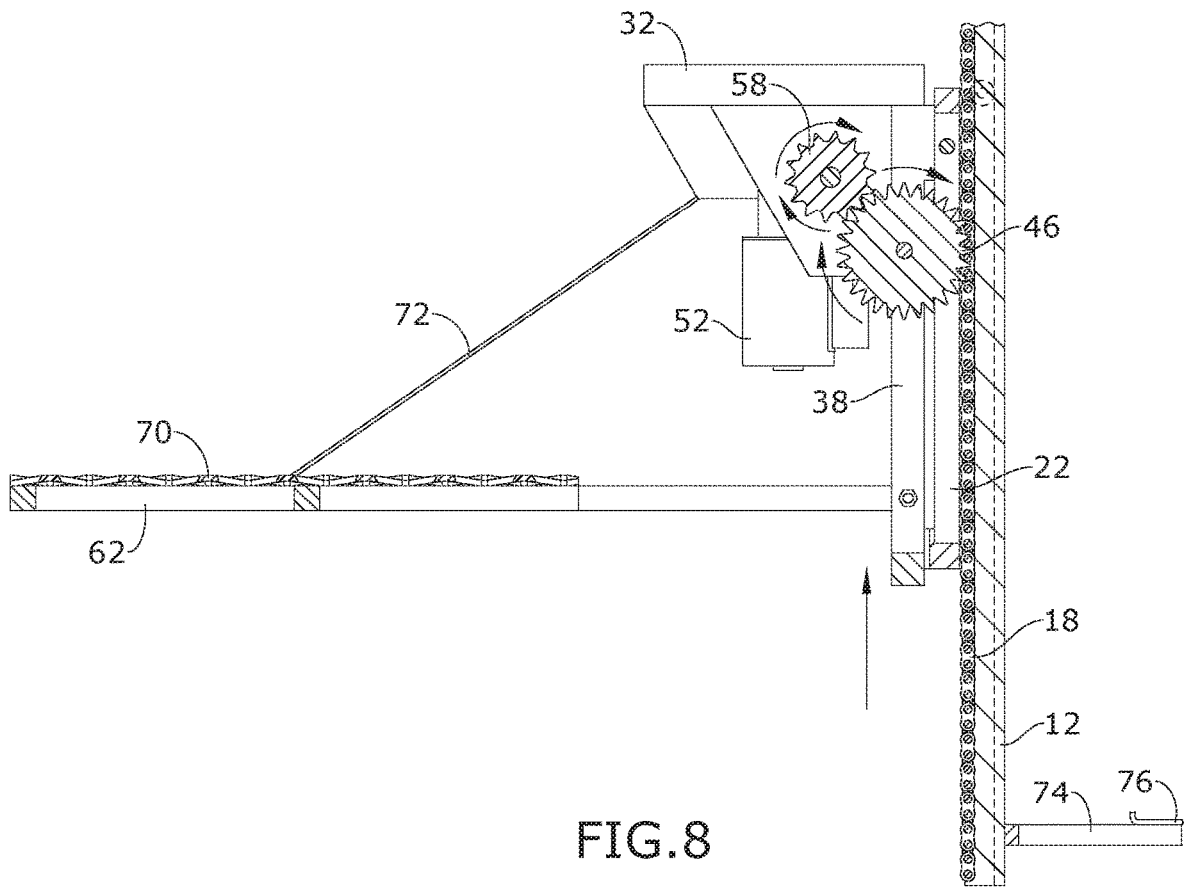
FIG. 8 is a section view of the embodiment of the present invention taken from the same perspective as FIG. 7, illustrating the movement of the stand assembly.

In accordance with certain embodiments of the present invention, a switch 36 is provided on a lateral side of the seat 32 to provide easy access of use for an operator, and selectively controls operation of the motor 52. FIG. 4 illustrates wiring 82 schematically for clarity and to show how the switch 36 is electrically connected to the battery 50 and motor 52, the battery 50 providing power to the motor 52. Any known means of connecting a switch 36 to a battery 50 and motor 52 may be employed. The drive gear 46 is operably connected to the motor 52 via a gearbox 54 (supported by gearbox bolts 60) and a gearbox spindle 56, the gearbox spindle 56 driving the speed reducing gear 58 that subsequently rotates the meshed drive gear 46. As shown in FIGS. 4, 7 and 8, a drive gear axle 44 supports the drive gear 46 and gear bearings 48, and the drive gear 46 meshes with the chain track 18 to drive the stand assembly 30 and carrier assembly 20 along the elongated track 10 in unison upon actuation of the motor 52.

In accordance with certain embodiments of the present invention, as shown in FIG. 3, to assemble the stand assembly 30 to the carrier assembly 20, the peg hooks 40 mount to a corresponding peg 24 on the carrier assembly 20, which results in the attachment bolts 42 aligning with and extending through openings in the attachment bar 26. As shown in FIG. 9, the opening defined by the carrier frame 22 allows the drive gear 46 to pass through the carrier assembly 20 and directly engage the chain track 18 when the carrier assembly 20 is mounted on the elongated track 10.

As shown in FIG. 10, a method of using the invention may include the following. First, the elongated track 10 is attached to the tree 80 via the straps 78, with the carrier assembly 20 installed and resting at the bottom of the elongated track 10. The stand assembly 30 is then hooked onto the carrier assembly 20 and bolted into place via the attachment bolts 42, which locks the drive gear 46 into place with the chain track 18. Once seated on the stand assembly 30, a user presses the switch 36, engaging the motor 52 to turn the drive gear 46 and raise the stand assembly 30 up the elongated track 10. When the user is ready to descend, he or she presses the switch 36 in the opposite direction to reverse gear motion and lower the stand assembly 30. If the user desires to move to a position higher than the elongate track 10 allows, he or she can attach a track extension at the top of the elongate track, which is described in greater detail below.

In accordance with the present invention, FIGS. 11-14 show an alternative embodiment of the elongated track. The structure and functionality of the elongated track is generally the same as previously described, and the elongated track is attached to the tree 80 with the same hooks 76 and straps 78 described previously. The alternative track includes a track frame 84 that serves to as a guide for the carrier assembly 20, as previously described. A chain track 18 is disposed on a front surface of the track frame 84 and engages with the drive gear 46 as previously described.

The embodiment of FIGS. 11-14 provides coupling mechanisms at upper and lower ends of the track frame 84 to allow a plurality of track frames 84 to be connected to one another, allowing a user to extend the elongated track further up the tree if so desired. As shown in FIG. 11, a coupling sleeve 86 is attached at an upper end of each track frame 84. A male coupling tube 88 is further provided at the upper end of the track assembly and sits within a channel defined by the coupling sleeve 86. At the lower end of each track frame 84 is a female coupling tube 90 that slidably mates with the male coupling tube 88 of an adjacent track frame 84, as shown in FIGS. 11-14. The locations of the sleeve 86, the female coupling tube 90, and male coupling tube 88 could be reversed and provide the same coupling in the spirit of the present invention. As shown in FIG. 12, adjacent track frames 84 are aligned axially, and male coupling tube 88 is slid into female coupling tube 90, with the coupling sleeve 86 surrounding the lower end of the adjacent track frame 84. As seen best in FIGS. 12 and 13, each male coupling tube 88 and female coupling tube 90 define substantially the same cross-sectional shape. The shape is such that rotation or twisting of the female coupling tube 90 (and thus rotation/twisting of the entire track frame 84) about the axis of the elongated track is prevented when a respective female coupling tube 90 is mated with the male coupling tube 88 of an adjacent track frame 84. In the illustrated embodiment, the shape defined is substantially square; however, any number of shapes may be used that would provide resistance to twisting. If a user desires to move to a higher vantage point than a single mounted track frame 84 allows, he or she may bring an additional track frame 84 along on the motorized stand assembly 30. The user then connects the additional track frame 84 to the mounted track frame 84 in the manner described above and completes the assembly by securing the tree brackets 74 with straps 78 around the tree 80, as previously described.

It should be understood, of course, that the foregoing relates to exemplary embodiments of the present invention and that modifications may be made without departing from the spirit and scope of the invention as set forth in the following claims.

What is claimed is:

1. A motorized stand for attachment to a tree, the stand comprising:
   a stand assembly comprising a motor and a platform;
   a carrier assembly releasably coupling with the stand assembly; and
   an elongated track comprising a plurality of track assemblies configured to connect to one another, each track assembly comprising:
   a track frame;
   a coupling sleeve at a first end of the track frame;
   a male coupling tube at the first end of the track frame; and
   a female coupling tube extending from a second end of the track frame and configured to couple with the male coupling tube of an adjacent track assembly,
   the carrier assembly releasably and movably coupling with the elongated track, and the motor being configured to drive the stand assembly and the carrier assembly along the elongated track when the stand assembly, the carrier assembly, and the elongated track are coupled together.

2. The motorized stand of claim 1, wherein the stand assembly further comprises a seat and a switch positioned on a lateral side of the seat and electrically coupled to the motor, the switch selectively controlling operation of the motor.

3. The motorized stand of claim 1, wherein the stand assembly further comprises a plurality of hooks and the carrier assembly further comprises a plurality of support pegs, each hook being releasably coupled to a corresponding support peg of the plurality of support pegs to couple the stand assembly to the carrier assembly.

4. The motorized stand of claim 3, wherein the stand assembly further comprises a plurality of attachment bolts and the carrier assembly comprises an attachment bar, each of the plurality of attachment bolts extending through respective openings defined in the attachment bar when the stand assembly is coupled to the carrier assembly.

5. The motorized stand according to claim 1, wherein each track assembly further comprises at least one wheel guide slot and the carrier assembly comprises at least one roller wheel, the at least one roller wheel being disposed within the at least one wheel guide slot.

6. The motorized stand according to claim 1, wherein each coupling sleeve surrounds the second end of the track frame of the adjacent track assembly when the plurality of track assemblies are connected to one another.

7. The motorized stand according to claim 1, wherein the plurality of track assemblies are axially aligned when connected to one another, and the female coupling tube and male coupling tube of adjacent track assemblies slidably couple along the axis.

8. The motorized stand according to claim 7, wherein each female coupling tube defines a cross-sectional shape and each male coupling tube defines substantially the same cross-sectional shape, the shape being such that rotation of the female coupling tube about the axis of the elongated track is prevented when a respective female coupling tube is mated with the male coupling tube of the adjacent track assembly.

9. The motorized stand according to claim 1, wherein each female coupling tube defines a cross-sectional shape and the male coupling tube defines substantially the same cross-sectional shape, the shape being such that rotation of the female coupling tube about an axis of the elongated track is prevented when a respective female coupling tube is mated with the male coupling tube of the adjacent track assembly.

10. The motorized stand according to claim 1, wherein the stand assembly further comprises a drive gear driven by the motor and the elongated track further comprises a chain track, the drive gear engaging the chain track when the stand assembly and elongated track are coupled to one another.

\* \* \* \* \*